Figure 1:
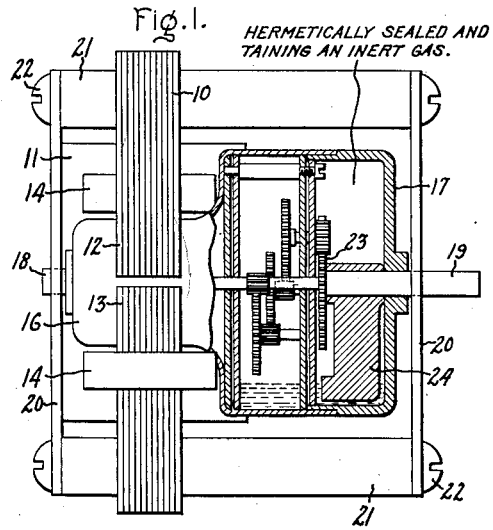

May 28, 1935. H. E. WARREN 2,003,163

DRIVE FROM SEALED GEAR CASING

Filed March 24, 1934

Inventor:
Henry E. Warren,
by Harry E. Dunham
His Attorney

Patented May 28, 1935

2,003,163

UNITED STATES PATENT OFFICE 2,003,163

DRIVE FROM SEALED GEAR CASING

Henry E. Warren, Ashland, Mass., assignor to Warren Telechron Company, a corporation of Maine Application March 24, 1934, Serial No. 717,221

12 Claims. (Cl. 172—36)

My invention relates to sealed gear casings and the like and to means for transmitting rotary motion from the inside to the outside of such casings. In particular, my invention relates to means for obtaining rotary motion from a motor, the rotor and gear reduction of which are sealed in an air-tight lubricating chamber, which chamber may contain, in addition to a sufficient quantity of suitable lubricating oil, a gas which is inert with respect to such lubricating oil for the purpose of preventing the oil from coming in contact with air or other gases which after a time tend to decompose the oil and render it unsuitable for lubricating purposes.

In the construction of small motors, such as those used for driving clocks and the like, it is common practice to enclose the rotor and speed-reducing gearing in a lubricating chamber and to provide a terminal drive shaft extending through the wall of the chamber. An arrangement such as this is disclosed in my United States Patent No. 1,495,936, May 27, 1924.

It is the aim of the manufacturer to provide a grade and quantity of lubricating oil in the chamber when the motor is built to serve through the natural life of the motor, and to seal the chamber so that the oil will not leak out and dirt cannot get into the chamber to contaminate the oil. Difficulty is experienced, however, in certain cases, particularly where the motor is subject to considerable and frequent temperature variations. This is due to the fact that a temperature rise creates a pressure in the casing tending to force the air therein out around the terminal shaft and with it any oil that may be in this restricted passage. Upon a lowering of the temperature and, consequently, the pressure in the casing, air is sucked in again but most of the oil which has been forced out of the casing is invariably lost. This breathing action is sufficient in some cases to undesirably restrict the useful life of the motor due to lack of lubrication. Also, the oil leak is undesirable because the escaping oil soils other parts of the apparatus with which the motor is associated. As the oil in the chamber is reduced and is replaced by air, decomposition of the remaining oil becomes more rapid. Especially is this true where the breathing action of the motor occurs in an atmosphere contaminated with gases to which the oil is particularly susceptible.

According to the present invention, the chamber containing the motor rotor and gear reduction with the proper quantity and grade of lubricating oil is hermetically sealed and preferably all air is also excluded from the chamber and replaced with some inert gas, such as nitrogen or carbon dioxide, which will prevent or greatly retard decomposition of the lubricating oil. I combine with this hermetically sealed casing some suitable arrangement, such as hereinafter described, for transmitting rotor motion from the interior to the exterior of the gear casing. The oil cannot leak out and it is effectively protected from decomposition and contamination so that such a motor, when operating a light load such as a clock, should have an extremely long life even when subjected to frequent and wide temperature variations in an oil contaminating atmosphere.

Figure 4:
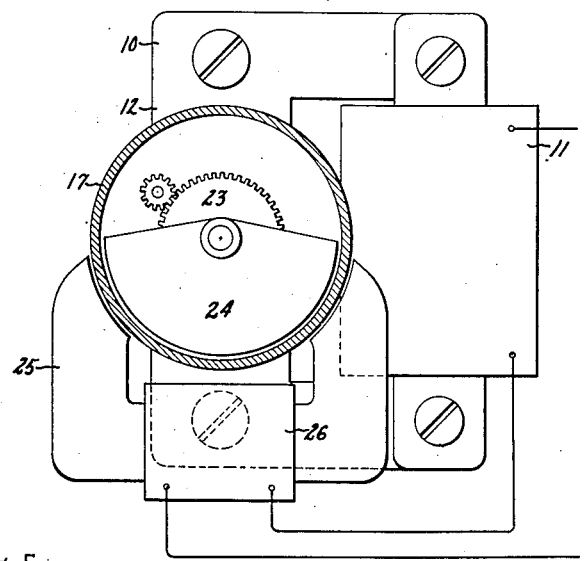
Figure 5:
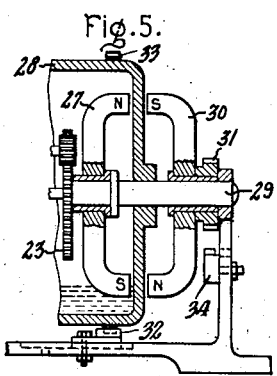

The features of my invention which are believed to be novel and patentable will be pointed out in the claims appended hereto. For a better understanding of my invention, reference is made in the following description to the accompanying drawing, Figs. 1 and 2 of which illustrate partially sectional side and end views of a clock motor, the rotor and gear reduction of which is contained in a hermetically sealed lubricating chamber arranged to transmit useful motion from the motor to an external shaft by a gravity torque arrangement which causes the casing, itself, to be rotated; Fig. 3 shows the relation between the pole pieces, rotor and rotor chamber of the motor of Figs. 1 and 2; Fig. 4 illustrates a partially sectional end view of the same arrangement as in Fig. 2 to which a magnet has been added to assist the gravity torque element; and Fig. 5 represents a modification where rotation is transmitted through the wall of a gear casing solely by a magnetic drive.

Figure 2:
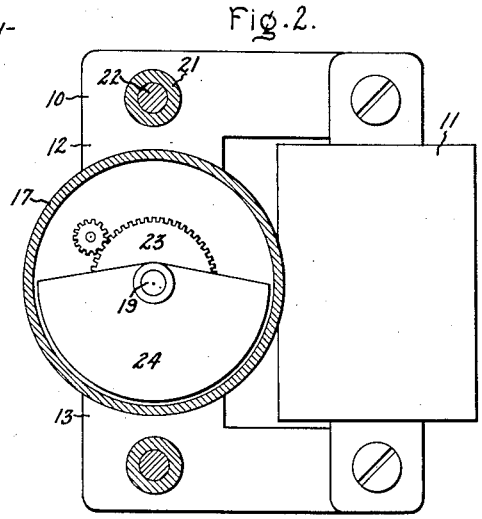
Figure 3:
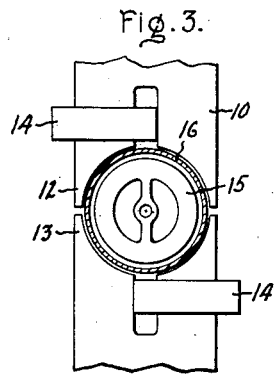

Referring now to Figs. 1, 2 and 3, the motor which has been illustrated may be of the self-starting synchronous type such as is shown in my Patent No. 1,495,936 and may consist of a bipolar stator 10 energized by a single phase coil 11. The pole pieces 12 and 13 of the stator element are provided with shading coils 14 on the trailing pole tip to create a rotating magnetic field in the circular space between the pole pieces. This is best shown in Fig. 3 where 15 represents the motor rotor on which this rotating field acts to produce rotation which, at synchronous speed, will be assumed to be 3600 revolutions per minute. The motor rotor 15 is contained in a reduced portion 16 of a gear casing 17 and, as will be noted in Fig. 3, there is a narrow annular gap between the reduced portion of the gear casing and the curved faces of the stator pole pieces.

The cylindrically shaped gear casing is provided with axial trunnions 18 and 19 at either end, rotatively supported in bearings in the vertical supports 20 which are in turn rigidly fastened in spaced relation to the stator field core by spacing rods 21 and machine screws 22. The entire gear casing is thus free to turn about its central axis which is the same as the axis of the motor rotor and its shaft.

The gear casing contains a suitable gear reduction, the motor rotor being connected to the high speed end. The details of this gear reduction train are not important, except that its supporting framework should be secured in fixed relation with the gear casing as represented. The low-speed end of this gear train terminates in a gear 23. This gear 23 is rotatively mounted concentric with the axis of the gear casing on the inner end of the trunnion 19, which extends through the end wall of the casing. This trunnion is rigidly secured to the casing and the opening in the casing through which it passes is hermetically sealed. In fact, the entire casing is hermetically sealed and is air and oil tight.

Secured to gear 23 and rotatable therewith on trunnion 19 is a weight 24 eccentric with its axis of rotation on trunnion 19. If now we assume that the motor is operated and that the gear casing remains stationary, weight 24 will be rotated about trunnion 19 at a slow speed determined by the speed of the motor and the gear reduction used. However, due to the fact that the entire gear casing is freely rotatable, weight 24 remains stationary and the gear casing revolves in a direction opposite to that at which the weight would be driven if it revolved at the same speed. The weight 24 is preferably made of lead or some other heavy material and gravity tends to keep it in a position below trunnion 19. The torque tending to rotate the weight is thus transferred to the gear casing through the gear supporting framework by this gravity torque arrangement so that a clock or other light load may be connected to the trunnion 18 or 19 and be driven thereby, the entire gear casing revolving while the weight 24 remains stationary.

The maximum load that can be transmitted from the gear casing corresponds to that required to rotate the weight through a ninety degree angle from the position shown at which angle the gravity torque arm becomes a maximum. If we assume that the gear reduction is such that the speed of the gear casing is one revolution per minute, it is quite apparent that the torque that may be transmitted through this gravity torque arrangement is considerably more than is required to drive an ordinary clock. The maximum torque capacity of the drive can, of course, be varied by using different weights and by using different lengths of torque arms therefor, and this portion of the gear casing can be enlarged to accommodate as large a weight as is desired. The torque that may be transmitted through this gravity torque coupling between the interior and exterior of the gear casing need not, of course, exceed the torque capacity of the motor at the low speed end of the gear train, and the speed reduction used and the size and torque radius of the weight should be properly related to the motor torque available and the load to be driven.

The weight will not ordinarily stand perfectly still or in the lowest position shown but may oscillate slightly about a position at some angle between that shown and the maximum torque angle of ninety degrees to the vertical, depending upon the load being transmitted and the load variations. The fact that the weight may move and seek a position depending upon the torque transmitted is advantageous as it provides in effect a flexible or resilient coupling between the motor and the load and assists in smoothing out torque pulsations that may be due to sudden changes in frequency and load, and in a measure gives a larger factor of safety against the motor's falling out of step than is obtainable with a rigid coupling between the motor and load. The same advantage of the flexible coupling thus obtained exists during starting operations and will assist in establishing synchronous operation where the motor is of the non-self-starting type that is started by spinning by hand.

The gear casing may thus be hermetically sealed and, prior to sealing, the required quantity and grade of lubricating oil is inserted to lubricate the gears and their various bearings. As illustrated in Fig. 1, a small quantity of oil is contained in the gear casing and, since the casing with the gear supporting plates rotate, the oil will be readily conveyed to all bearing surfaces therein without any special lubricating arrangements.

Since the casing is gas and oil tight, it is feasible and, in most cases, preferable to exclude air and replace it with an inert gas, such as nitrogen or carbon dioxide, or other gas which does not decompose the lubricating oil or attack the metallic surfaces with which it comes in contact. The oil is thus preserved in its original state and cannot leak out, insuring freedom from trouble, cleanliness, and long life.

In Fig. 4, I have illustrated the arrangement of Fig. 2 to which a magnet 25 has been added for increasing the downward pull on the weight 24, thereby increasing the torque capacity of the coupling over that due to gravity alone. In this case, the weight 24 is of magnetic material and the magnet 25 is positioned outside of the casing so that the weight 24 lies between its pole pieces as an armature. The pole faces of the magnet are slightly spaced from the casing so that the latter is free to rotate. Magnet 25 may be a permanent magnet but is preferably an electromagnet energized by a coil 26, which is connected preferably in series with the main coil 11 of the motor. In this case, the weight does not need to have as great a gravity torque component to transmit the same amount of torque as in Fig. 2 because here the magnet produces the same general result as gravity.

The shape of the armature weight and the position of the magnet with respect thereto is preferably such that the pull of the magnet increases as the weight turns away from the position shown. Thus, the magnetic pull increases with the torque transmitted in much the same manner as the gravity torque component increases with the transmitted torque. By connecting the electromagnet coil 26 in series with the main motor coil, the flux of the torque magnet 25 is made proportional to the motor current. In any form of motor where the current varies with load, the effect of the torque magnet will thus vary in proportion to the motor load due to this series connection.

It will be evident to those skilled in the art that a wide variety of torque transmitting characteristics may be obtained by varying the relation between the gravity and magnetic torque influences and the extent to which the latter is made responsive to the motor load. Where the torque transmitting arrangement depends upon gravity, the motor must, of course, be operated in a position where the axis of rotation of the weight is horizontal. However, if I use a magnetic armature instead of a weight and depend entirely upon magnetic action for the restraining force of the torque-transmitting member, the motor may be used in any position.

In Fig. 5, I have represented an arrangement for transmitting motion from the inside to the outside of the sealed gear casing when the casing does not rotate. In this modification, the casing 28 is rotatively mounted but may be held stationary as by a gear lock shown at 32 when the latter is slid to the right into the locking position shown to engage with a gear 33 secured to and surrounding the cylindrical casing 28. In this modification, a small permanent magnet 27 is rotatively mounted with the last gear 23 at the low speed end of the gear train inside the casing 28. With the casing stationary, these parts rotate on a stationary shaft 29 sealed through the end wall of the casing and the poles of the permanent magnet rotate closely adjacent this end wall. On the shaft 29 outside the casing is rotatively mounted a second permanent magnet 30 and driving pinion 31. The poles of the outer permanent magnet face closely adjacent the wall of the casing opposite those of the inner permanent magnet. A magnetic drive is thus formed through the wall of the casing due to the attraction between the two permanent magnets which causes them to rotate together. Where magnetic forces are thus conveyed through the walls of the casing, the casing will be made of some suitable non-magnetic material.

Fig. 5 may also be taken to represent the essential features of an arrangement where the casing rotates and the outer magnet is stationary and used to keep the inner magnet from rotating. For use in this way, the gear lock 32 is slid to the left into the unlocking position out of mesh with gear 33 so that the casing is now free to rotate and may drive an external load through gear 33, or otherwise. The external magnet 30 is then locked from rotation as by the gear lock 34, which is shown in the unlocked position, but which may be raised and secured in locking relation with gear 31 secured to the magnet 30. The stationary magnet 30 then holds the inner magnet 27 and gear 23 stationary, causing the gear casing 28 to revolve as described in connection with Fig. 1.

In accordance with the provisions of the patent statutes, I have described the principles of operation and essential features of my invention together with the apparatus which I now consider to represent the best embodiments thereof, but I desire to have it understood that the apparatus shown is only illustrative and that the invention can be carried out by other means.

What I claim as new and desire to secure by Letters Patent of the United States, is:

1. A hermetically sealed gear casing from which the air has been excluded and replaced by an inert gas, a gear train in said casing, oil partially filling said casing for lubricating said gear train, and means for conveying rotary movement from said gear train to the exterior of said casing.

2. A hermetically sealed casing from which air has been excluded and replaced by an inert gas, an electric motor having cooperating stator and rotor parts without and within said casing, respectively, a gear train in said casing driven by said motor, lubricating oil partially filling said casing and means for conveying rotary movement from said gear train to the exterior of said casing.

3. A hermetically sealed gear casing, an electric motor having a stator exterior of said casing and a rotor within said casing, a speed reducing gear train within said casing driven by said motor, oil partially filling said casing for lubricating said gear train, and means for conveying rotary motion from the low speed end of said gear train to the exterior of said casing.

4. A hermetically sealed rotatively mounted casing, a gear train supported within said casing, means for driving one end of said gear train, means mounted for rotation on the same axis as said casing connected in driving relation with the other end of said gear train, and means for restraining said last mentioned means from continuous rotation whereby said gear casing is driven about its axis of rotation from said gear train.

5. A cylindrically shaped casing mounted for rotation about its axis, an electric motor having a rotor within and a stator without said casing, a speed reducing gear train supported within said casing, driven by said motor, and having a gear at its low speed end rotatively mounted on the axis of rotation of said casing, and means for restraining said gear from rotation whereby the motor is caused to drive said casing.

6. A cylindrically shaped casing mounted for rotation about its own axis, an electric motor having a rotor coaxial with and within said casing, a stator for said motor exterior of said casing, a speed reducing gear train supported within said casing and driven by said motor, a gear at the low speed end of said gear train rotatively mounted at the low speed end of said gear train coaxial with the casing, and gravity means for resisting continuous rotation of said gear whereby said motor rotates said casing.

7. A cylindrically shaped casing mounted for rotation on its axis which is horizontal, an electric motor having a rotor within said casing coaxial with said casing and a stator without said casing, a spur gear train supported within said casing, driven by said motor, and terminating in a gear coaxial with said casing, said gear being rotatively mounted but restrained from continuous rotation by a weight secured thereto eccentric to the axis of rotation of said gear whereby said motor is caused to rotate said casing.

8. A cylindrically shaped casing mounted for rotation on its axis, an electric motor having a rotor within said casing coaxial with said casing and a stator without said casing, a spur gear train supported within said casing, driven by said motor, and terminating in a gear rotatively mounted on the axis of said casing, and magnetic means for yieldingly restraining said gear from continuous rotation whereby said motor is caused to rotate said casing.

9. A rotatively mounted casing, an electric motor having a rotor within said casing and a stator without said casing, a gear train supported in said casing, driven from one end by said motor, and terminating at the other end in a gear which is rotatively mounted on the axis of rotation of said casing, a magnetic armature secured to said gear, and a magnet exterior of said casing for resisting rotation of said gear and magnet.

10. A rotatively mounted casing, an electric motor having a rotor within said casing and a stator without said casing, a gear train supported in said casing, driven by said motor, and terminating in a gear rotatively mounted coaxial with said casing, a magnetic armature secured to said gear, an electromagnet exterior of said casing for resisting continuous rotation of said gear, and circuit connections for simultaneously energizing and deenergizing said motor and electromagnet.

11. A hermetically sealed casing, an electric motor having a rotor within said casing and a stator without said casing, a gear train in said casing driven by said motor, oil partially filling said casing for lubricating said gear train, an inert gas filling the unoccupied space in said casing, and a magnetic drive having one part connected to be driven from said gear train within said casing and having another part exterior of said casing for conveying rotary motion from said gear train to the exterior of said casing.

12. A sealed casing mounted for rotation and constituting a driving member, an electric motor having a rotor within said casing and a stator without said casing, a speed reducing gear train supported within said casing driven by said motor, the low speed end of said train terminating in a gear mounted for rotation coaxial with the axis of rotation of said casing, and means constituting a resilient torque coupling between said gear train and casing for yieldingly restraining said gear from rotation.

HENRY E. WARREN.